(12) United States Patent
Chu et al.

(10) Patent No.: US 6,999,469 B1
(45) Date of Patent: Feb. 14, 2006

(54) MESSAGE SYNCHRONIZATION IN A COMMUNICATIONS SYSTEM

(75) Inventors: Jonathan Chu, Marlboro, NJ (US); Franco Yuvienco, New York, NY (US)

(73) Assignee: CyberTel, Inc., Middletown, NJ (US)

( * ) Notice: Subject to any disclaimer, the term of this patent is extended or adjusted under 35 U.S.C. 154(b) by 872 days.

(21) Appl. No.: 09/824,830

(22) Filed: Apr. 3, 2001

Related U.S. Application Data

(60) Provisional application No. 60/229,678, filed on Sep. 1, 2000.

(51) Int. Cl.
*H04J 3/16* (2006.01)
(52) U.S. Cl. ...................................... 370/466; 370/503
(58) Field of Classification Search ................ 370/310, 370/351–3, 400–3, 469–476, 503; 455/412, 455/426, 556, 66, 561; 379/88.13, 93.01, 379/142.07, 265.09
See application file for complete search history.

(56) References Cited

U.S. PATENT DOCUMENTS 6,792,085 B1 *  9/2004  Rigaldies et al. ........ 379/88.13

2003/0097361 A1 *  5/2003  Huang et al. ................. 707/10

OTHER PUBLICATIONS

Stallings Data and Computer Communications, 1997, Prentice-Hall, fifthe edition, pp:512-515, 518, 524-525.*
Microsoft Press, Computer Dictionary, 1994, second edition, pp:147.*
Newton, Newton's Telecom Dictionary, 1996, Flatiron Publishing, Inc., 10th edition, pp:59-60.*

* cited by examiner

*Primary Examiner*—David Vincent
(74) *Attorney, Agent, or Firm*—Gibbons, Del Deo, Dolan, Griffinger and Vecchione (57) ABSTRACT

Message Synchronization of the present inventions begins with storing messages (e-mail, voice mail, faxes) in more than one (1) message repository allowing users multiple, differentiated access points (e.g.: IP Client, PSTN). From any of these points, messages can be altered to reflect any one or more of a number of defined messages states (e.g.: Deleted, Read, Unread). As a seamless service to the user, these changed states are reflected identically throughout the face of all access points, and the bodies of all repositories.

6 Claims, 10 Drawing Sheets

MESSAGE SYNCHRONIZATION IN A COMMUNICATIONS SYSTEM

CROSS-REFERENCE TO RELATED APPLICATIONS

This application is related to and claims priority from Provisional Application No. 60/229,678, entitled "A Synchronization Agent for Use in a Communications System," having a filing date of Sep. 1, 2000.

FIELD OF THE INVENTION

The invention relates generally to the field of data synchronization and more particularly to the field of synchronizing data states and data for messaging in a communications system.

BACKGROUND

Current communications technology provides for the use of numerous devices and services for sending and receiving messages. The public switch and telephone network, for example, implements a variety of data transmission services. Telephone system users are typically equipped for sending and receiving real-time voice, fax transmissions, pages and voice-mail. Recent trends in telephone system advancement have focussed on "anytime, anywhere" capability, particularly in the field of wireless communications. Users desire the ability to place real time telephone calls at anytime and from any location.

In addition to the various telephone-based communication services in common use, Internet-based communications provide users with system and service alternatives. For example, it is common for a typical Internet user to have at least one, and usually more than one, e-mail account, and various voice-over-the-Internet systems have been suggested. Services, such as e-mail forwarding, have also emerged for Internet-based systems. Capabilities in Internet-based systems, however, have not achieved the "anytime, anywhere" capability of wireless telephone communications, in part because a personal computer ("PC") provides the typical portal to the Internet. PC's are too bulky to provide "anytime, anywhere" access to the Internet, even in the laptop format.

Devices, such as handheld computers, personal digital assistants (PDA's), and wireless access protocol (WAP) devices could provide a platform for "anytime, anywhere" Internet access capability, but these devices create further difficulties for a user. Having multiple devices with multiple platforms requires a user to select among the available platforms and services. This could entail using a PC to access e-mails, a pager for messages, a telephone for voice mail, and a fax machine for faxes. Any one or more of these devices may not be available at a particular time. Additionally, the uncertainty of an intended receiver's access to these systems often causes a sender to send the same message over more than one of the systems. When the data is accessed from one platform, the message remains in the other systems. There is a need, therefore, for a system and method that provides a user the ability to seamlessly access messages and services from any available platform.

SUMMARY OF THE INVENTION

A communications system according to the principles of the invention provides for platform-independent communication through multiple access points, and for the sending and receiving of various message formats (differentiated message data), such as e-mail, voice mail, and faxes, from various devices ("any device, any service" capability). For example, a user can obtain voice mail messages over a personal computer linked to the Internet, or can hear e-mail over a cellular telephone. The access points are any points in the communications system permitting access to the differentiated message data, including the Public Switch Telephone Network (PSTN) and the Internet. A message engine for processing and distributing the differentiated message data is provided.

A system according to the principles of the invention can also provide message synchronization of the differentiated message data. Message Synchronization includes storing message data (e-mail, voice mail, and fax) in more than one message repository. The message data can be accessed via multiple, differentiated access points, for example via an Internet Protocol Client (IP Client) or the PSTN. When a message is processed from any of these points, message attributes, such as message states, associated with the message repositories can be altered. Examples of message state attributes are "Delete", "Marked for Delete", "Read", and "Unread". When an attribute is changed via an access point, the changed attributes are reflected identically throughout the face of all access points in the communication system. The bodies of the repositories are also synchronized to reflect the message states. To the user, the system operates as a seamless, integrated communications system.

BRIEF DESCRIPTION OF THE DRAWINGS

A more complete understanding may be obtained from consideration of the following description in conjunction with the drawings in which.

DETAILED DESCRIPTION

A communications system according to the principles of the invention provides for platform-independent access to differentiated message data ("any device, any service") and implements message synchronization across the platforms. Message synchronization provides for synchronized differentiated message data in more than one data repository. A message engine handles and distributes the message data, and a message synchronization engine synchronizes message data attributes, such as states, and the differentiated message data stored in the repositories. Exemplary interfacing through an IP client and through the PSTN will be described. A description of an exemplary message synchronization engine implemented with interfacing objects and processes is also provided.

A. Platform-Independent Communications System

Figure 1:
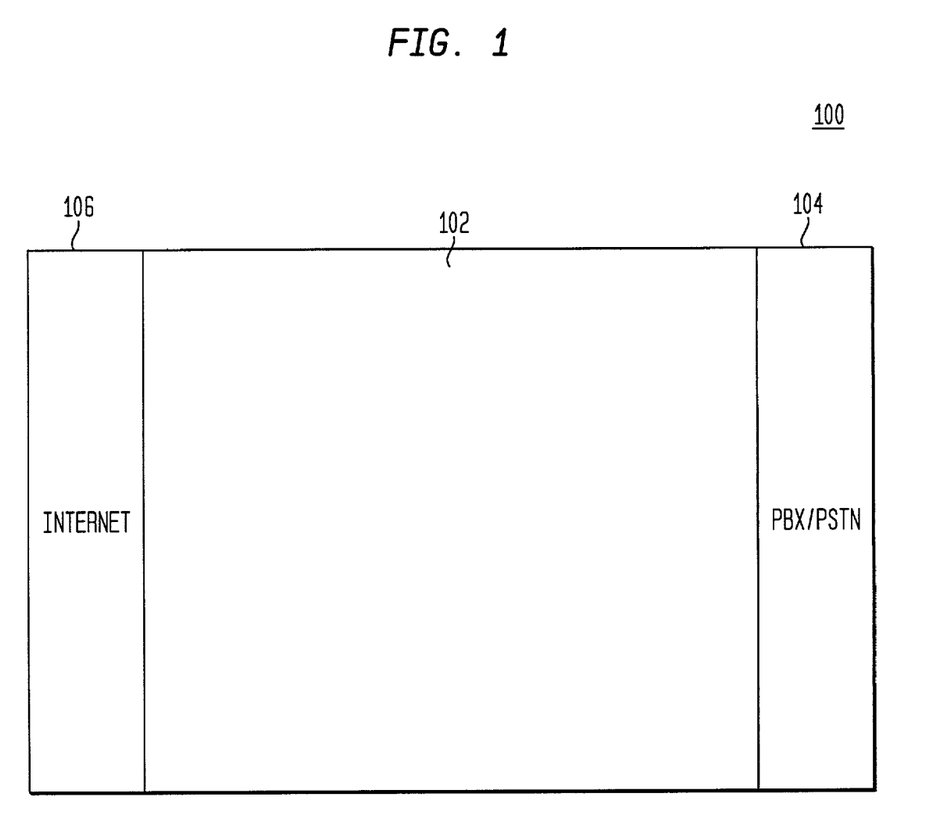
FIG. 1 shows a block diagram of a system according to the principles of the invention.

A block diagram for an exemplary system 100 is shown in FIG. 1. The system 100 includes a Bridge 102, which interfaces with the PBX/PSTN 104 (Private Branch Exchange/Public Switched Telephone Network) and the Internet Protocol (IP) Network 106. The PBX/PSTN 104 provides access to the telephone system and related services, such as voice communications, fax transmission and paging. The Bridge 102 also interfaces with the IP Network 106, which can be accessed through wired and wireless systems, such as personal computers, Personal Digital Assistants (PDAs) and Wireless Access Protocol (WAP) devices. The IP Network 106 and the PBX/PSTN 104 are portals in the communications system 100. The Bridge 102 includes a message engine for distributing messages across these portals 104 and 106 and provides for platform-independent ("any device") communication. For example, the Bridge 102 can process text e-mail data types so that they are available to a user accessing the system 100 via a telephone over the PSTN.

The Bridge 102 also provides for a platform-independent service ("any service") capability. For example, in addition to telephone-based voice mail "Reply, Forward and Broadcast," the Bridge 102 provides for Internet Protocol (IP) "Reply, Forwarding, Broadcast" functions. A voice reply can be supplied as an attachment to e-mail. Forwarding can also be provided over the PSTN so that, for example, fax and e-mail can be forwarded to a fax machine. The Bridge 102 also provides for notification of new messages, such as voice, e-mail and fax, to cell phones, pagers and e-mail, using Short Message Services (SMS) messages, Short Messages Peer to Peer Protocol (SMPP) and Simple Network Paging Protocol (SNPP). The Internet portal can provide voice messages, fax messages, e-mail notifications, and PSTN forwarding to fax machines. In this respect, a communications system according to the principles of the invention is an integrated, platform-independent system providing "any device, any service" capability.

Figure 2:
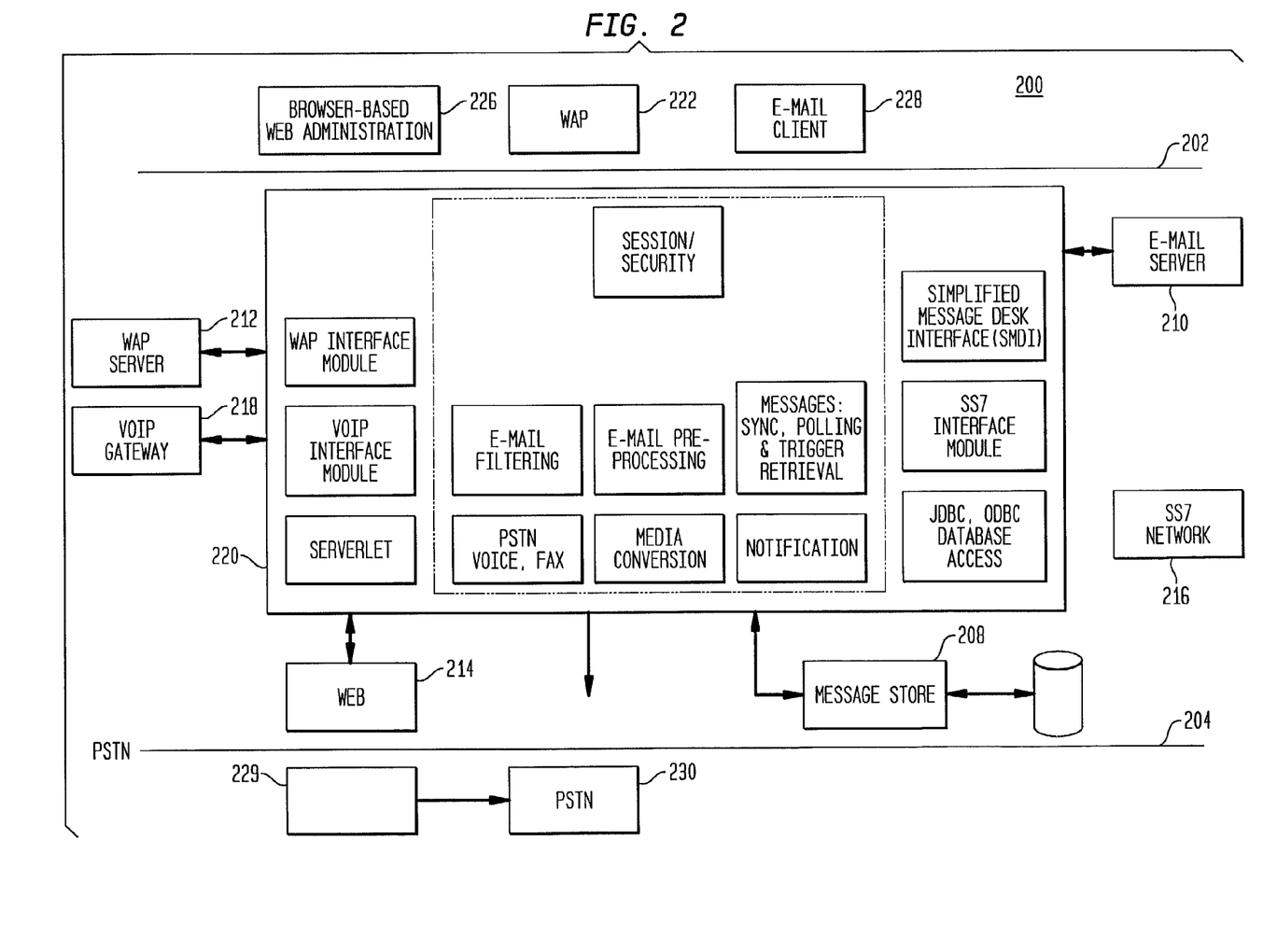
FIG. 2 shows an exemplary architecture according to the principles of the invention.

FIG. 2 shows an exemplary architecture 200 for implementing the system 100 of FIG. 1, including a message engine 220. The exemplary message engine 220 can be implemented with an architecture of clustered, load-balanced, redundant modular servers. The IP and PSTN interfaces are shown as lines 202 and 204. The message engine 220 processes differentiated message data and provides message services, as will be explained hereafter. The message engine 220 communicates with an e-mail server 210, a Wireless Access Protocol (WAP) Server 212, a WEB Server 214, and a Voice Over IP (VoIP) Gateway 218. A message store database 208 stores differentiated message data for the message engine 220. The message engine 220 can also communicate with devices over an SS7 Network 216. WAP devices 222, wired telephones and faxes 229, and e-mail clients 228 can access the message engine.

Figure 3:
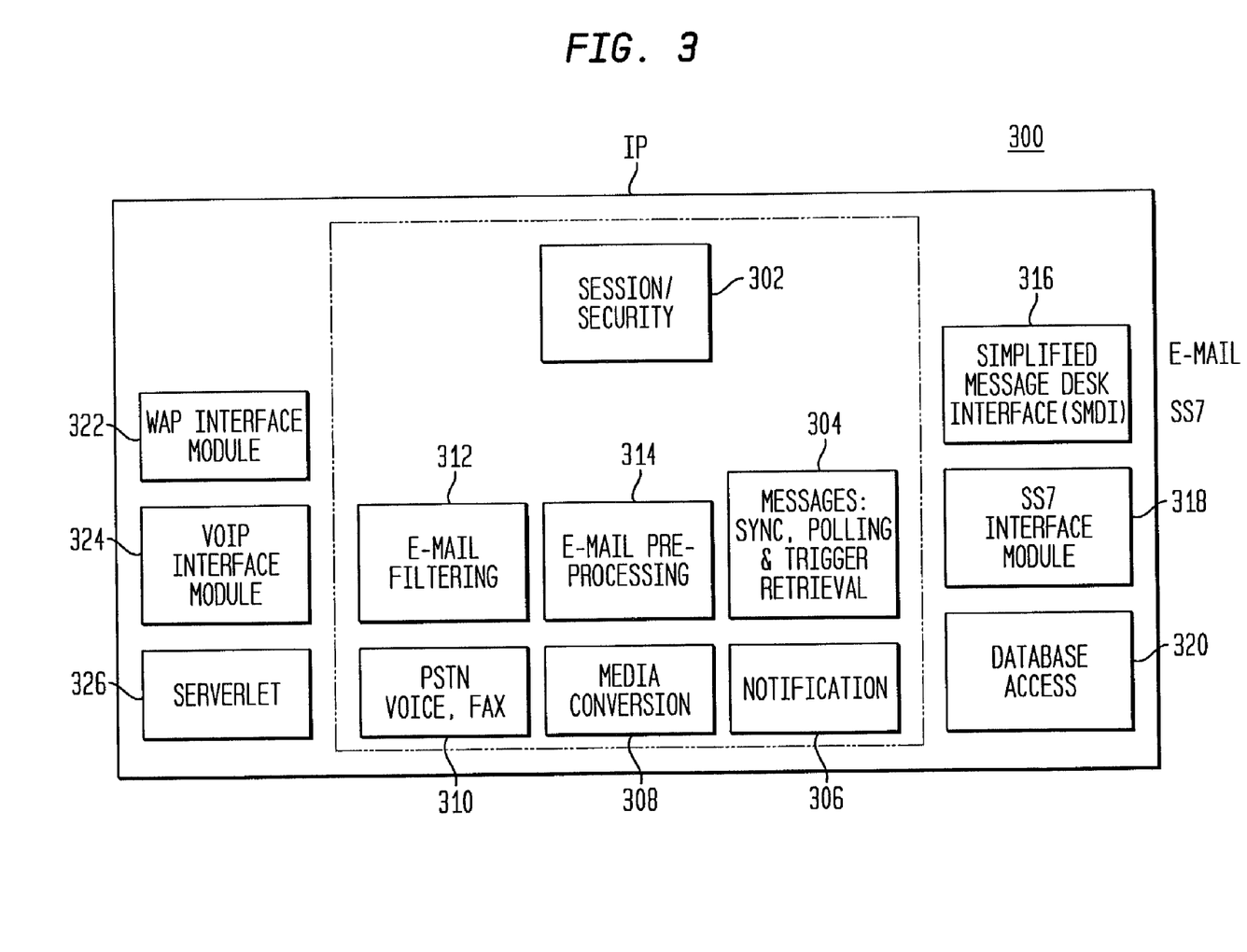
FIG. 3 shows a block diagram of a message engine according to the principles of the invention.

A block diagram 300 of the message engine 220 of FIG. 2 is shown in FIG. 3. The message engine 300 acts as an access point for incoming and outgoing messages, and synchronizes differentiated message data and message states so that access through any IP or PSTN portal device is uniform. In this embodiment, the message engine 300 includes a Session/Security server 302, a PRS server 304, a Notification server 306, a Media Conversion server 308, a PSTN server 310, an E-mail Filtering server 312 and an E-mail Pre-Processing server 314. The Session/Security server 302 manages all client sessions. Security can be provided via a subscriber service interface (SSI) protocol, which controls client authentication and authorization of services.

As will be explained more fully hereafter, the PRS server 304 synchronizes all PSTN and IP message types using polling and triggers to retrieve e-mail from the e-mail server, such as the e-mail server 210 of FIG. 2. Retrieved e-mails are stored in a message storage database, such as the database 208 shown in FIG. 2. The PRS server 304 can also retrieve other data types, such as voice mail and fax types, for the message storage database.

The E-mail Filtering server 312 acts as an e-mail filter to select or reject e-mails according to user preferences. Accepted e-mails are processed by the E-mail Pre-Processing module 314, which parses the mail and makes selective substitutions for e-mail by phone services. For example, text such as "A T and T" can be substituted for "ATT" so that the speech acquisition of text data types makes sense to the user. The Media Conversion server 308 digitizes and compresses voice messages and assembles telephone data types, such as voice and fax, into IP packets. This server 308 can also invoke the Text-to-Speech Engine (TTS) (not shown) to translate e-mail for e-mail by phone services. The TTS Engine stores the audio file in the message storage database. An exemplary TTS Engine suitable for this purpose is ETI-ELOQUENCE by ELOQUENT Technology, Inc.

The Notification server 306 provides the notification messages for new voice, fax and e-mail messages. These notifications can be sent to various devices, such as cell phones via Short Message Peer to Peer Protocol (SMPP), which is an input method into wireless systems for Short Messaging Services (SMS) Messages. The Notification server 306 can message pagers using the Simple Network Paging Protocol (SNPP) and e-mail accounts via the IP.

Figure 4:
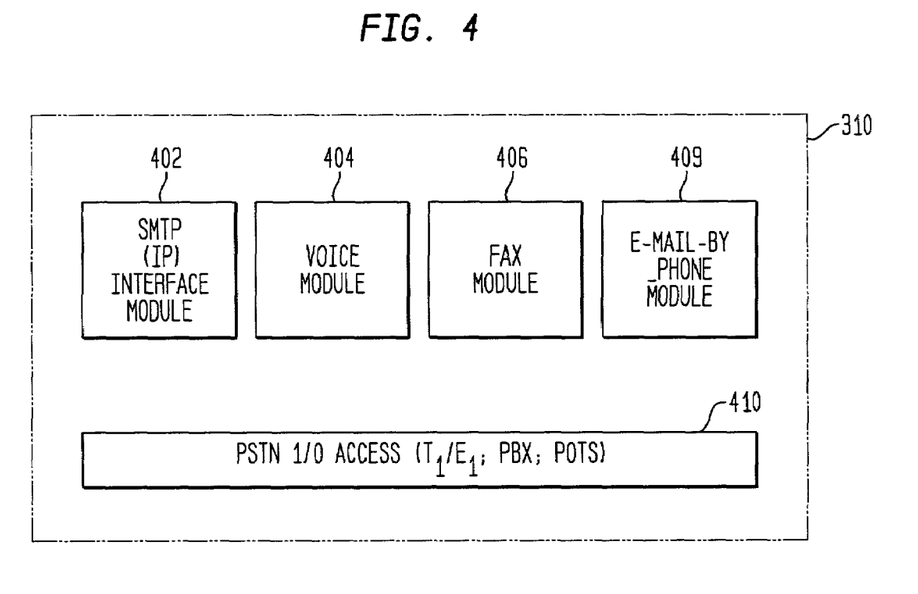
FIG. 4 shows submodules of the message engine shown in FIG. 3.

The PSTN Voice/Fax server 310 provides for receiving voice and fax data types and storing them using the message store database, and provides the ability to interface with the IP and PSTN. It includes five submodules, as shown in FIG. 4. The SMTP (IP) Interface Module 402 sends, forwards and broadcasts voice and fax messages to the appropriate e-mail account via the IP Network. The messages can be sent as e-mail attachments. The Voice Module 404 receives voice message data and stores the voice messages on the message store database, retrieves voice messages from the data store, and then plays the messages through the PSTN/IO Access Module 410. Likewise, the Fax Module 406 receives fax messages, stores fax messages, and can retrieve stored fax messages and process them (send, forward, broadcast) over the PSTN/IO 410. The E-mail-By-Phone Module 408 is a speech engine that plays TTS voice files to clients via the PSTN, and provides the ability to respond with a voice recording attachment sent by e-mail.

Referring again to FIG. 3, the database access module 320 provides the message engine 300 access to databases for storing, for example, user account information, service transactions, and status data. It also provides access to the message store database, such as the database 202 shown in FIG. 2, which stores differentiated message data. The message store permits access to, and storage of, voicemails, faxes, audio e-mail (TTS) and data used for the telephone. The serverlet for Web-based Administration 326 provides for HTTP/HTTPS-based user account set up and management and HTTP/HTTPS system administration and management.

The remaining functional blocks provide the various interfaces between the message engine and the IP and PSTN. The VoIP interface module 324 provides the VoIP gateway. The module is H323, SIP, and MGCP compliant. The WAP interface module 322 is standards compliant and interfaces to third-party WAP gateways. The SS7 module 318 is a full PSTN interface providing network services, wireless services and call routing. The Simplified Message Desk Interface (SMDI) 316 provides the PBX signaling interface.

Figure 5:
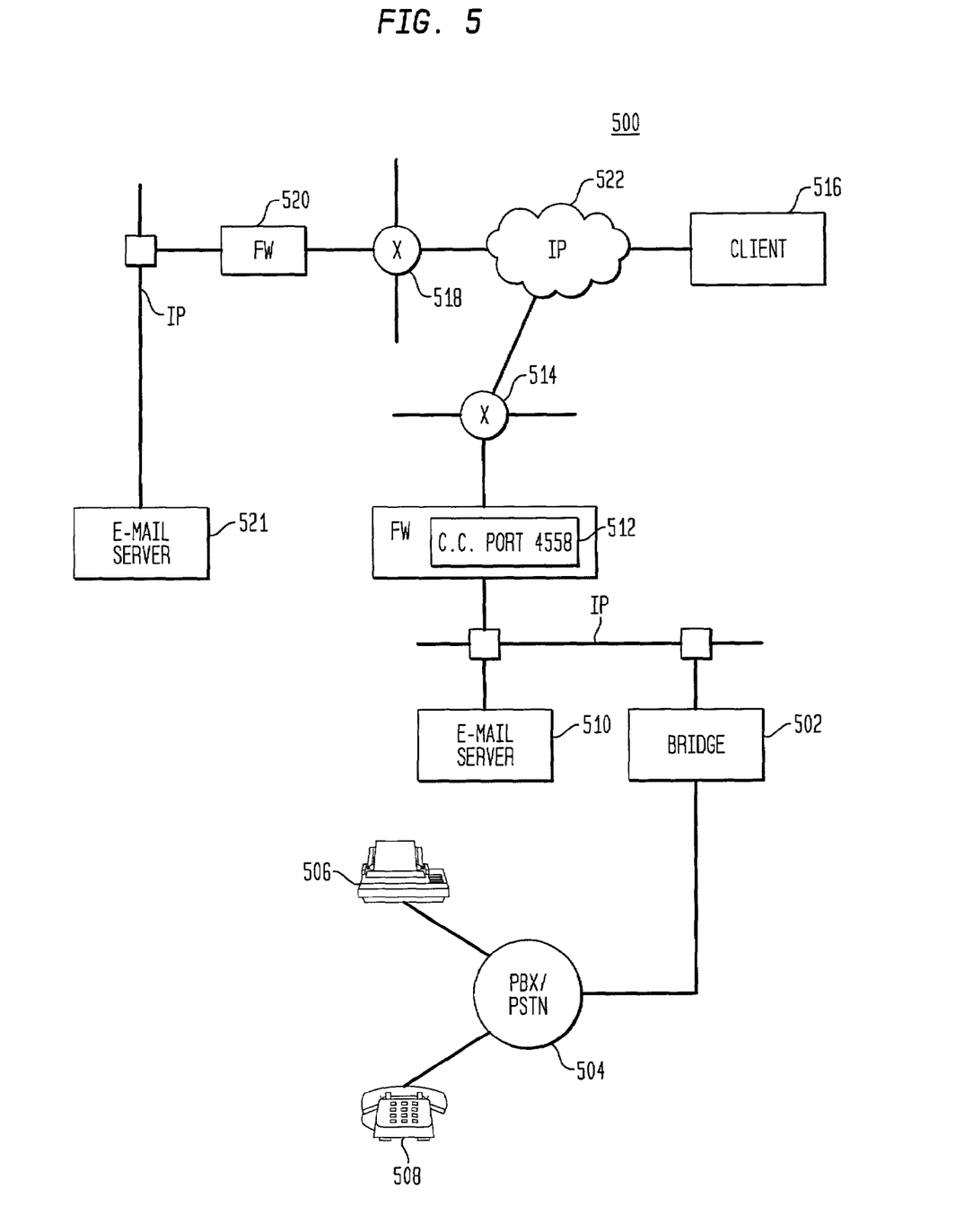
FIG. 5 shows a diagram of a network according to the principles of the invention.

FIG. 5 is a network diagram illustrating interfacing of the Bridge 502, which includes the message engine, with the PBX/PSTN and with existing e-mail servers according to the principles of the invention. The Bridge interfaces with the PBX/PSTN 504, which provides access to fax 506 and telephone 508. The IP network cloud 522 is shown coupled to two e-mail servers and a Java client 516. For one e-mail server 510, the IP network is connected to a firewall 512 via a router 514. The firewall provides access to the e-mail server 510. The other e-mail server 521 is also accessed through a firewall 520 and a router 518. The Java client is connected both to the e-mail servers and to the Bridge. It connects to the e-mail servers using POP3 or IMAP-4 protocols, and to the Bridge through a subscriber service interface. The Bridge 502 is addressed through a static IP address. It connects to the e-mail servers using the POP3 and IMAP-4 protocols, and it connects to the Java client 516 using a subscriber service interface. Ports are provided for sending or receiving the required information.

The Java client provides platform-independent access to the Bridge 502, and to the e-mail servers 510 and 522. An example of a POP3, IMAP-4 compliant Java client of the type suitable for this purpose is FreeCom$^{3G}$ by CyberTel, Inc. This Java client can provide all in one E-mail, Voicemail and fax capability via the Bridge 502. It should be apparent, however, that other clients can be supported.

B. Message Synchronization

Figure 6:
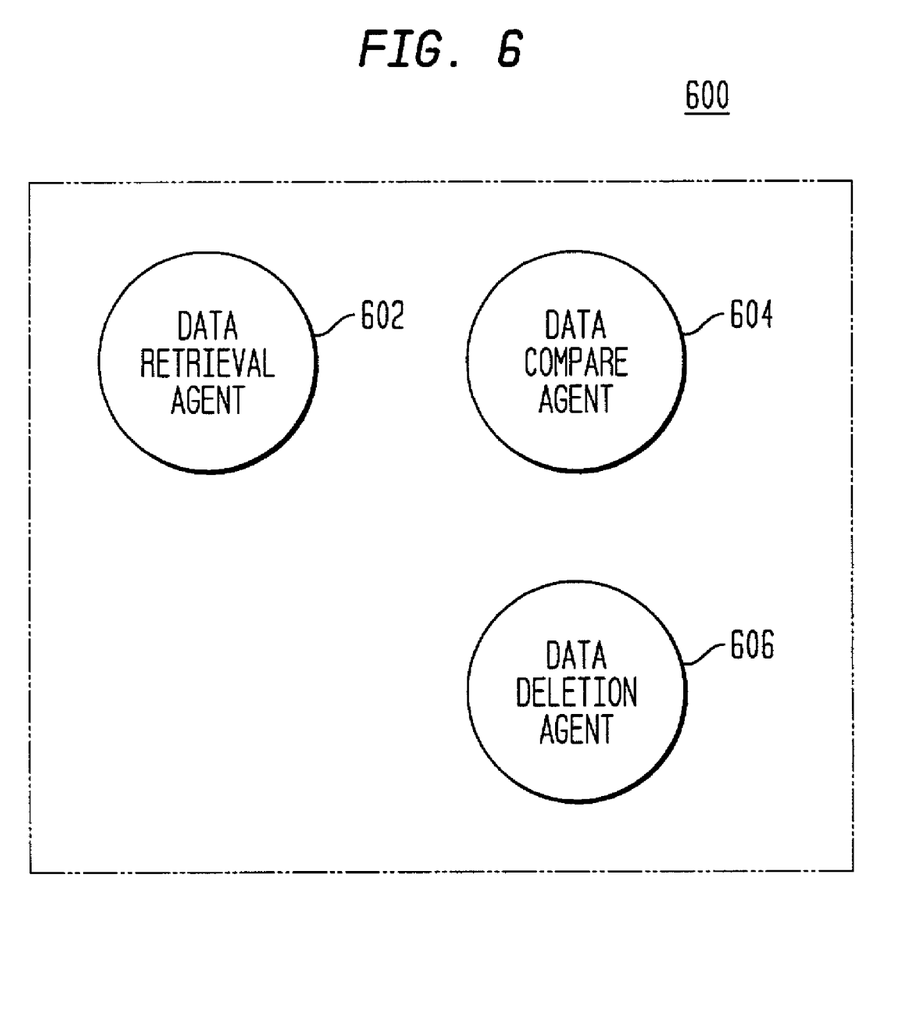
FIG. 6 illustrates an exemplary architecture for message synchronization and relay service according to the principles of the invention.

FIG. 6 shows an exemplary PRS server architecture 600 for the message synchronization and relay functionality that can be used in a communication system according to the principles of the invention, and that can be implemented in, for example, the PRS server 304 of FIG. 3. Message synchronization provides for synchronizing the differentiated message data types, such as e-mail, voice mail and fax, that are stored in the multiple message repositories. The PRS server 600 synchronizes the states of sent and received messages so that changed message states are reflected identically throughout the face of access points in the system and throughout the data repositories in the system. Data synchronization is supported on a request basis. All access points have trigger mechanisms available in a waiting state and are enabled with a server socket. Once a request is created by the access point and sent to its corresponding trigger mechanism, synchronization is activated for that user. When synchronization is activated, the data repositories are updated to reflect the identical data states.

The exemplary PRS server 600 of FIG. 6 is a multi-threaded server composed of a data retrieval agent 602, a data compare agent 604 and a data deletion agent 606. Threads are grouped and pooled for efficient usage of allocated resources. The data retrieval agent 602 complies with POP3 protocol for Internet style mail, but can be fitted with other agents to comply with other protocols for retrieving structured data. The data compare agent 604 compares data attributes and generates lists of synchronized data. The data deletion agent 606 also complies with POP3 protocol for deleting Internet style mail, but can be fitted to comply with other protocols to delete other types of structured data.

To facilitate message synchronization, the messages are homogenized and provided with superficial attributes. Homogenization of messages means that all data types are expressed in a single message format, and can be carried out with a suitable SMTP agent. In a system such as the system of FIG. 2 implementing the PRS server 600 of FIG. 6, the differentiated data types are homogenized as POP3 compliant, Internet style e-mail. Non-mail messages, such as voice and fax, are converted to e-mail messages in the e-mail server by attaching the messages to an e-mail, although homogenization could take place elsewhere in the system. The homogenized messages are then given superficial attributes, such as READ, UNREAD, MARKED FOR DELETE, and DELETE. The POP3 format remains unaltered. The attributes permit the messages to be synchronized from a common anchor point.

Figure 7:
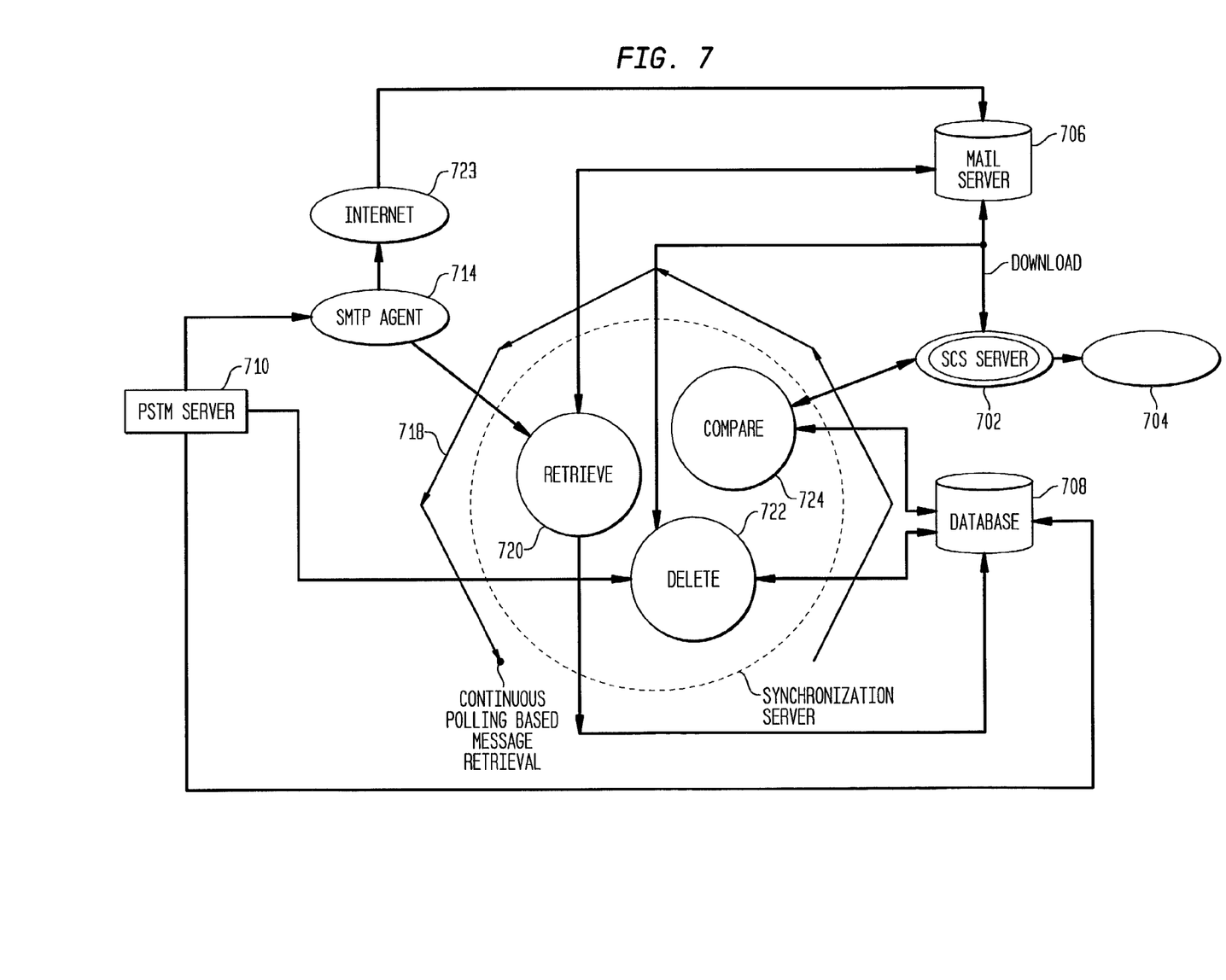
FIG. 7 illustrates process flow for polling and retrieval and message synchronization according to the principles of the invention.

The PRS server provides for three event-triggered synchronization scenarios. FIG. 7 shows a process flow 700 for Compare/Retrieve, Delete and Retrieve synchronization. To reduce latency in the system the PRS server also provides for continuous polling and message retrieval. Message flow for synchronization is explained with reference to the message flow diagram 700 of FIG. 7. The diagram 700 indicates message flow and events among selected servers, agents and clients of the overall system, an example of which is shown in FIG. 2.

1. Synchronization-Compare/Retrieve

Compare and retrieve synchronization involves the SCS server 702, a mail server 706, a database 708, the PRS server 718, and the PSTN server 710. The mail server 706 and the database 708 store lists of mail messages that may require synchronization. The database 708 is the repository for the message engine. The mail data includes superficial attributes (such as for indicating states). A mail client 704 communicates with the SCS server 702. The PRS server 718 includes the compare 724, delete 722 and retrieve 720 agents. The Internet 723 is accessed via the mail server 706 and the SMTP agent 714.

Compare and retrieve synchronization works like this. The mail client 704 logs on, logs off, or requests to send or receive a message. The SCS server 702 receives the request, and requests the mail server 706 to download all new messages to the SCS server 702, where they are temporarily stored. The SCS server 702 then sends a trigger event to the compare agent 724. In response to the trigger event, the compare agent 724 retrieves the list of messages on the database 708, compares the list to the list retrieved by the SCS server 702 from the mail server 706, and generates a new synchronized list. The synchronized list reflects messages with synchronized states. The compare agent 724 sends the new list to the SCS server 702, which provides the list to the mail client 704. The mail client 704 updates its local list from the new list. The retrieve agent 720 receives a trigger event from the compare agent 724, and then retrieves all new messages from the mail server 706 and writes the messages to the database. At the end of this processing, the mail server, mail client, and database have synchronized mail messages.

2. Synchronization Delete

Still referring to the flow diagram 700 of FIG. 7, synchronization after a DELETE request is explained. In this example, the user requests to delete a message from the database 708 via the PSTN server 710, although other methods of accessing the database can be implemented. The delete request invokes a trigger to the delete agent to synchronize newly deleted messages. The delete agent 722 retrieves messages having a message state of delete from the database 708, and instructs the mail server 706 to delete all messages marked for delete from the server 706. When the message records are successfully deleted from the mail server 706, the corresponding records are deleted from the database.

3. Synchronization Retrieve

Retrieve synchronization is invoked when a new message is left for a user. In this example of retrieval synchronization, a message, such as a voice or fax message, is left via the PSTN server 710. The voice or fax file is sent to the SMTP agent 714 for sending, and the SMTP agent 714 composes an Internet style message that includes the voice or fax message as an attachment. The message is sent via the Internet 722 to the POP3 compliant mail server 706. The SMTP agent 714 initiates a trigger to the retrieve agent 720, which retrieves all new messages from the mail server 706. The retrieve agent 720 writes all the new messages to the database 708, synchronizing the mail server 706 and the database 708.

4. Continuous Polling and Retrieval

In addition to the trigger-invoked retrieval discussed above, the PRS server 718 also implements polling based retrieval. The polling/retrieve routine causes the synchronization agent to inquire of client e-mail accounts or other message data repositories to determine whether any changes have occurred to these databases. Without polling, saving messages to the database 708 would rely on triggers. Using polling, if new messages are present, the synchronization agent retrieves the message and deposits it in a data repository, such as the message database 708. Polling and retrieving messages periodically reduce latency caused by the transfer of large amounts of messages produced when synchronization is triggered.

5. List Comparison

Message synchronization according to the principles of the invention is further illustrated with reference to FIGS. 9A and 9B as well as FIG. 7. In an exemplary embodiment, a trigger event for the compare agent 724 is the passing of one of two sets of parameters. The first set 900 of FIG. 9A includes two lists. The first is a data list 902 representing all of the required message data from some mail server, and the second 904 is a data list representing all of the required message data from a database, such as a message store database. The mail server data list 902 is an ordered list (reflecting the exact order kept in the mail server), which contains unique message IDs (UIDs) 906 that have been generated by the mail server. The database list 904 is an ordered list and also contains the same unique message IDs (UIDs) 906 that have been generated by the mail server, unique message IDs 908 that have been generated by the database (unique sequence number), as well as an additional character 910. This character is a superficial attribute added to all messages indicating the current state of the corresponding message. Possible message states are as follows:

D=Delete
M=Marked For Delete
R=Read
U=Unread

Since both lists 902 and 904 are ordered, comparisons can be made efficiently by simply comparing the values from matching indices, as indicated by arrows 912. If UID values do not match, as at 914, the compare agent recognizes that this message has been deleted from the mail server and responds by removing the corresponding element from the database list, as shown in the synchronized list 920. In the synchronized list 920, message 2 of the database list has been deleted. In the scope of message deletion, message records in the database cannot be deleted unless the corresponding message has been deleted from the mail server first. This rule allows the compare agent to be assured that if two UIDs being compared from both lists do not match, that the message represented by the UID in the database list has been deleted from the mail server.

While iterating through both lists, the compare agent will also detect for message states of 'D' in the database list. If a 'D' is encountered it is evidence that the corresponding message has been requested for deletion. For each state of 'D' that is found, the compare agent passes the corresponding UID and sequence index number to the deletion agent which first deletes the message from the mail server, and then deletes the corresponding record from the database. Once iteration of these lists is complete, all deleted messages should no longer exist, either in the mail server, or the database.

Figure 9A:
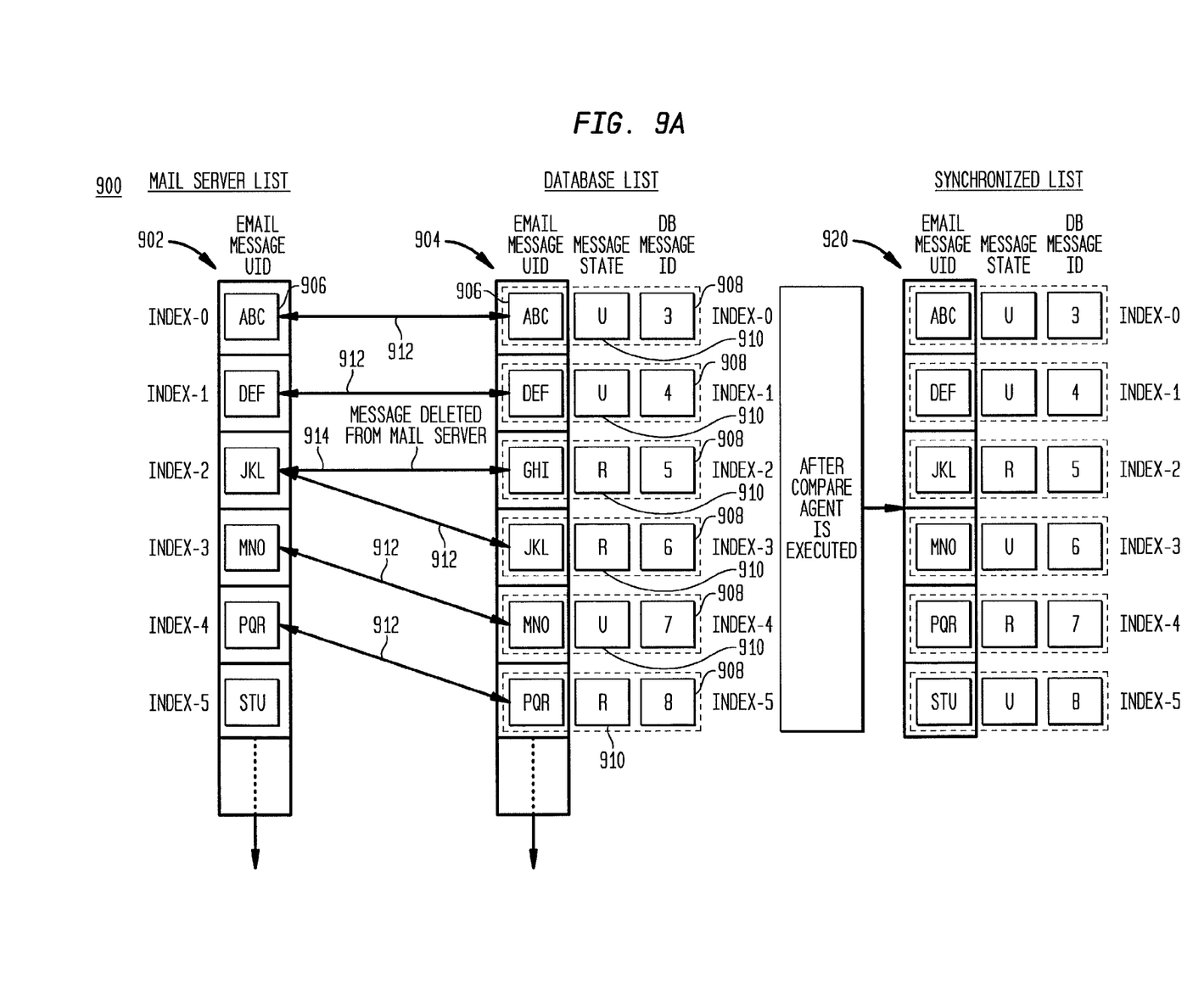
FIGS. 9A and 9B illustrate synchronization according to the principles of the invention.
Figure 9B:
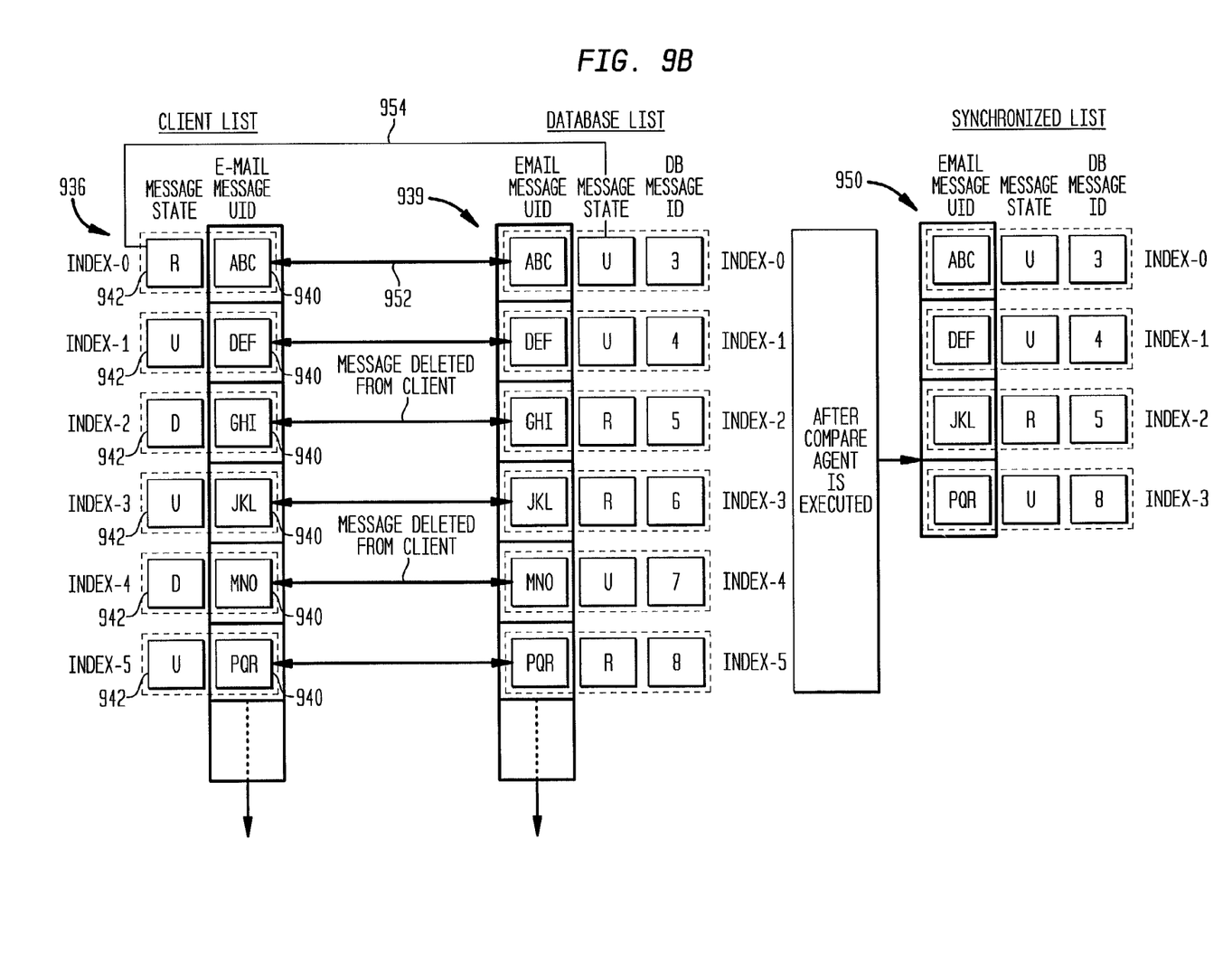

The lists 936 and 938 in FIG. 9B illustrate operation of the compare agent when passed the second set of parameters. The first list 936 represents a data list from a client, while the second represents a data list 938 from the message database. The client data list 936 is an ordered list (reflecting the order kept in the mail server), which contains unique message IDs (UIDs) 940 that have been generated by the mail server and an additional character 942 representing the current state of the corresponding message ('D', 'M', 'R', 'U'). The database list 938 has the structure, content, and format of the database list 904 of FIG. 9A.

The ordered nature of these lists allows for the comparison of matching/non-matching values by indices. During the iterative comparison between the lists, the compare agent conducts a conditional two-phase assessment and generates a new, synchronized list 950 that will be returned to the client, and used to update all client messages. The first phase is a check for matching UIDs, as indicated by arrow 952. If two UIDs are found to match, the compare agent enters the second phase assessment, which compares the message states from both lists, as at 954. In comparing message states, if message states differ, whichever state takes precedence will be the state that is added to the newly generated synchronized list. The precedence in this embodiment is D>M>R>U, where D has highest precedence. This synchronization is reflected in the synchronized list 950.

Referring now to FIGS. 9A and 9B, since the client can only mark a message as 'D' (not physically delete the message), the compare agent is guaranteed to register this message and its last known state/state change from the client. Contrary to this, the management of the database list allows for the complete physical deletion of message records, which can only be triggered by one of the three following events:

1) Formal request.
2) A message state of 'D' is detected while iterating the client data list.
3) A non-matching UID is detected while iterating through the mail server data list.

This delete methodology allows one list (database list) to be the single anchor point of reference for synchronizing message states.

C. Object Architecture for PRS Server

Figure 8:
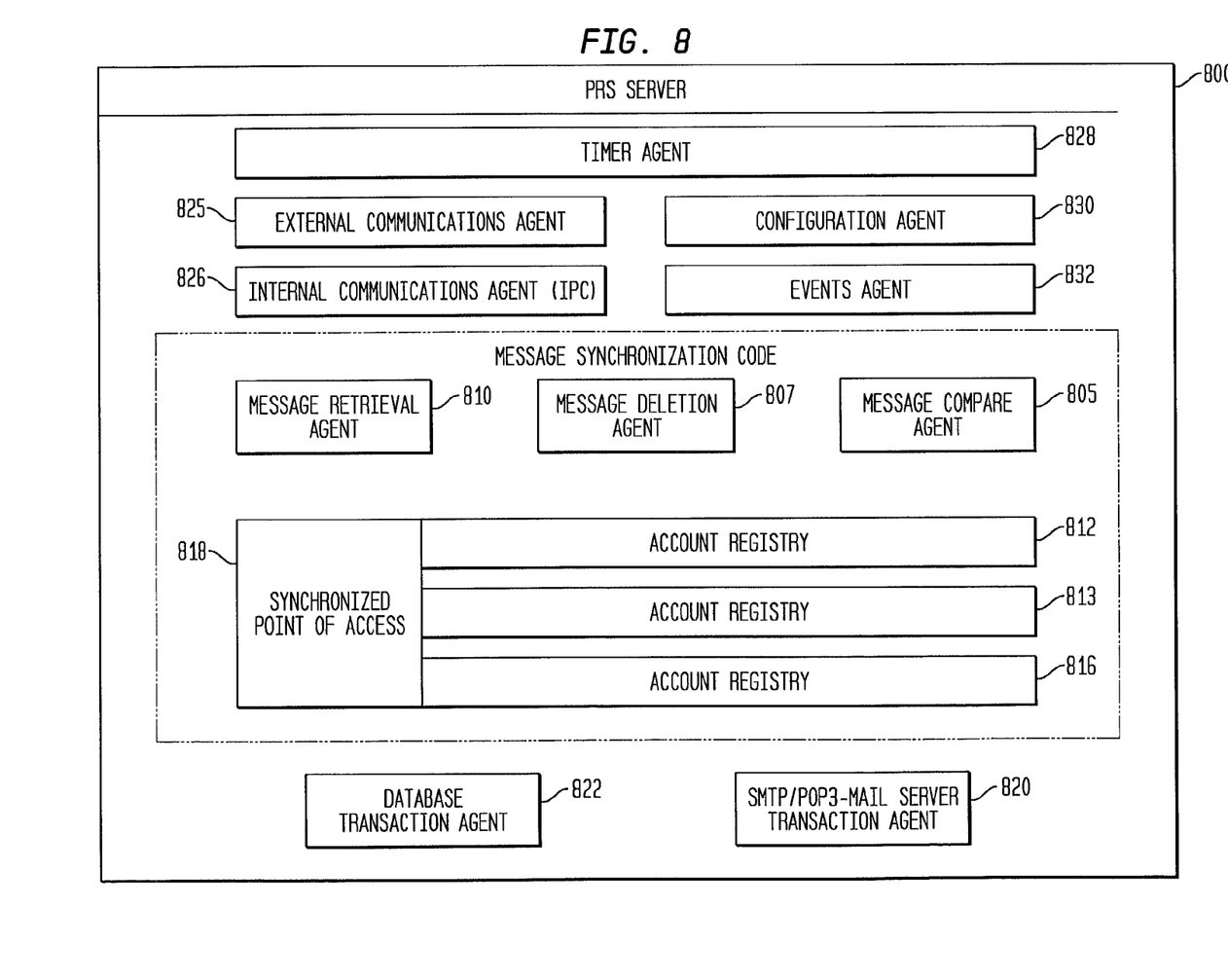
FIG. 8 illustrates an object architecture for a system carrying out the processes illustrated in FIG. 7.

FIG. 8 illustrates the object architecture 800 for an exemplary PRS server 802 that carries out the synchronization and polling/synchronization processes according to the principles of the invention. The architecture 800 can be used in the PRS server of the message engine 300 of FIG. 3. Where references are made to entities external to the PRS server architecture 800, such as the message store database, the mail client, and the mail server, reference can be had to the description of these entities in the discussion of FIG. 2. Additionally, the interaction of the compare 806, delete 808 and retrieval 810 agents with the objects in an exemplary system was described with reference to the process flow diagram 700 of FIG. 7.

The object architecture 800 includes the message synchronization core 804, which provides the compare, delete and retrieval functions. The compare agent 806 compares a list of message states (attributes) from a message store database to a list of message states in a mail client. If a message in one list has a state that takes precedence over a state in the other list, the compare agent 806 updates the message state. An exemplary message state precedence can be, in order of decreasing precedence, DELETE, MARKED FOR DELETE, READ, and UNREAD. This means that when comparing the states of two messages from, for example, a mail client and the message database, the compare agent will give precedence to DELETE over MARKED FOR DELETE, READ or UNREAD and so on.

At the end of the compare process, both message state lists should be the same, and the message state lists are sent back to their respective origin to update the messages. The delete agent 808 looks for DELETE states in the list of message states in the message store database, and generates a list of references to the identified messages. The delete agent 808 then deletes the referenced messages from the mail client and the message store database. The retrieval agent 810 retrieves all new messages from the mail server, generates UNREAD states for each, and saves a copy of the message to the message store database.

Also included in the message synchronization core 804 are agents for providing session locking. Session locking prohibits multiple message retrieval processes (from different points of entry to the unified system) from writing data to a message repository more than once. These agents include bit arrays acting as a message store account registry 812, a mail client account registry 814, and a PSTN account registry 816. These registries function as locking mechanisms for each session, such as a retrieval session. When a request for synchronization occurs, the registries are checked to determine if a lock (in the bit set) is activated (set to 1). In this manner, the point of access agent 818 communicates with the registries to provide mutually exclusive locking and unlocking. When an action, such as a write, is requested, the POA agent 818 checks the account registries to determine whether a session is underway. If so, the POA agent 818 locks the request out from the compare, delete and retrieve agents. Otherwise, the POA agent unlocks the agents that carry out synchronization. After processing a request for synchronization, the corresponding lock is deactivated (set to 0).

The remaining agents in the architecture 800 provide communication, control and configuration functionality. The mail server transaction agent 820 and the message store transaction agent 822 manage and execute reads, writes and updates to one or more mail servers and one or more message store database servers, respectively. The external communications agent 824 and the internal communications agent 826 support inter-process and intra-process communications. These agents 824 and 826 can be socket-based communications agents, can implement proprietary communications protocols for security, and give a common context to running processes. This allows for servers and agents to notify other dependent servers or agents of possible failures, successes, need for resources or other messages expedient to processing.

The timer agent 828 controls the invocation of each multiple account message retrieval session based upon specified time intervals. The configuration agent 830 configures configuration parameters. The event agent 832 handles errors and exceptions in the server. For example, the event agent 832 formats errors and writes them to a log file.

An exemplary object table for a PRS server according to the invention is provided below:

| PRS SERVER/OBJECT TABLE | |
|---|---|
| ccTimer | Establishes a time interval for polling and initiates multiple message retrieval process. |
| ccINIT | Connects to database to retrieve user account(s) information. |
| | Initializes user data for single account retrieval. |
| | Initializes user data for multiple account retrieval. |
| | Manages message retrieval thread pool(s). |
| ccMRA | Creates thread for single/multi user message retrieval. |
| | Supports multiple encoding/character set messages. |
| | Implements message notification services. |
| | Determines message type (e-mail, voice, and fax). |
| | Writes all retrieved messages to database server. |
| ccCOMM_PRS | Establishes multi-threaded listener socket for clients. |
| | Processes client requests - delegating tasks. |
| | Coordinates protocol parsing. |
| ccSYNC | Implements parser for protocol authentication. |
| | Accepts client requests for synchronizing messages. |
| | Creates and compares message state lists for sync. |
| | Deletes messages from database for synchronization. |
| | Deletes messages from e-mail server for synchronization. |
| | Distributes updated message state list for continuity |
| ccMSOBJ | Establishes e-mail server connectivity |
| | Proxy for all e-mail server specific requests. |
| | Shared object. |
| ccDBOBJ | Establishes database server connectivity. |
| | Proxy for all database server specific requests. |
| | Shared object. |
| ccEVENTS | Shared object open for all agents. |
| | Creates log file. |
| | Responsible for logging all events, errors, exceptions. |
| ccCONFIG | Creates configuration file with user defined values. |
| | Used to read server parameters from configuration file. |
| | Supports on-the-fly parameter value. |
| ccSHUTDOWN | Analyzes current PRS processes/threads. |
| | Locks communication layer from further client requests. |
| | Terminates all server processes. |

The software configuration for synchronization according to the principles of the invention can include a JAVA Virtual Machine. The user's e-Mail servers should include an SMTP Server address and an IMAP-4 or POP3 Server address. In view of the foregoing description, numerous modifications and alternative embodiments of the invention will be apparent to those skilled in the art. Accordingly, this description is to be construed as illustrative only and is for the purpose of teaching those skilled in the art the best mode of carrying out the invention. Details of the structure may be varied substantially without departing from the spirit of the invention, and the exclusive use of all modifications, which come within the scope of the appended claim, is reserved.

What is claimed is:

1. A communications system comprising:
    a message engine adapted to handle differentiated message data, the message data having assignable attributes;
    at least one access to the differentiated message data;
    repositories for storing the differentiated message data, wherein the message engine includes a synchronization engine for synchronizing the differentiated message data according to the attributes; and
    an agent operable to homogenize the differentiated message data, the differentiated message data being of one data type.

2. A method for providing access to differentiated message data stored in a plurality of data stores, comprising the steps of:
    assigning attributes to ones of the differentiated message data, the attributes having a precedence;
    maintaining lists corresponding to the message data stored in ones of the data stores, the lists including the attributes assigned to the ones of the differentiated message data;
    in response to a trigger event, comparing ones of the lists;
    providing a synchronized list according to the attributes; and
    updating ones of the data stores according to the synchronized list;
    wherein the lists further comprise message data identifiers, the data stores include at least a first data store and a second data store and the lists include a first ordered list corresponding to the message data stored in the first data store and a second ordered list corresponding to the message data stored in the second data store, the comparing step including the step of comparing the first ordered list and the second ordered list.

3. The method of claim 2 wherein the step of providing the synchronized list includes the step of excluding message data corresponding to message data identifiers in the second ordered lists that are not in the first ordered list.

4. A method for providing access to differentiated message data stored in a plurality of data stores, comprising the steps of:
    assigning attributes to ones of the differentiated message data, the attributes having a precedence;
    maintaining lists corresponding to the message data stored in ones of the data stores, the lists including the attributes assigned to the ones of the differentiated message data;
    in response to a trigger event, comparing ones of the lists;
    providing a synchronized list according to the attributes; and
    updating ones of the data stores according to the synchronized list; and
    homogenizing the message data.

5. The method of claim 4 wherein the homogenizing step includes the step of generating the differentiated message data in one data type.

6. The method of claim 5 wherein the one data type is an e-mail data type.

* * * * *